Aug. 16, 1960 E. D. LEON 2,949,022
CONSTANT VELOCITY UNIVERSAL JOINT
Filed April 2, 1958 3 Sheets-Sheet 1

INVENTOR.
EDGAR D. LEON
BY
*Barnes, Kisselle, Raisch & Choate*
ATTORNEYS

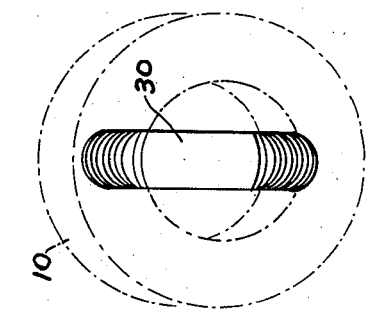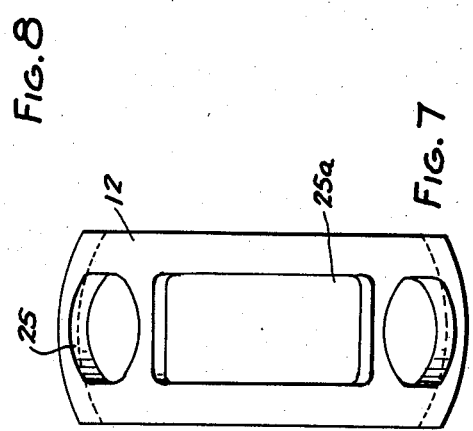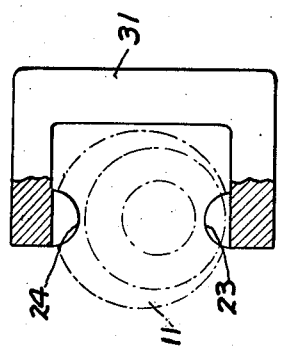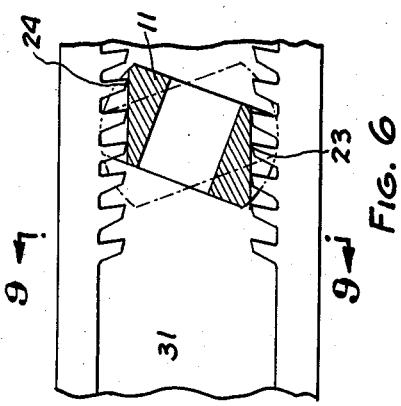

Aug. 16, 1960　　　　E. D. LEON　　　　2,949,022
CONSTANT VELOCITY UNIVERSAL JOINT
Filed April 2, 1958

INVENTOR.
EDGAR D. LEON
BY
ATTORNEYS

United States Patent Office 2,949,022
Patented Aug. 16, 1960

2,949,022

CONSTANT VELOCITY UNIVERSAL JOINT

Edgar D. Leon, 3359 Gratiot Ave., Detroit 7, Mich.

Filed Apr. 2, 1958, Ser. No. 725,861

12 Claims. (Cl. 64—21)

This invention relates to constant velocity universal joints of the type comprising a pair of inner and outer rotary members coupled together by a plurality of balls in register with meridian ball race grooves in the members with a cage member between the members.

Such constant velocity joints operate on the principle that the ball groove geometry compels the plane of the balls to assume an angle midway between the axes of the inner and outer rotary members, one of which is driving and the other of which is driven.

Constant velocity universal joints of the aforementioned types have been known and utilized for many years. Such joints have been successfully used but as constructed heretofore have certain inherent drawbacks. One of these is that where the grooves in the rotary members are arcuate, the cost of producing the joint is quite high making the use of the joint prohibitive in many applications. Such arcuate grooves are usually formed by a series of special machine generating and grinding operations which involves the utilization of a great deal of time and effort.

In addition, since the arrangement of the grooves and balls is such that there is a tendency to cam or crowd the balls in one direction only, a heavy thrust is placed on the ball cage member. As a result, the joint cannot be run at high speeds with the inner and outer members at large angles to each other. This camming or crowding of the balls in one direction only does not accurately locate the ball in the midway position and noisy operation and excessive overheating result.

Another problem encountered in constant velocity universal joints of this type is that the centrifugal force on the balls causes the balls to tend to move outwardly along the grooves thereby providing an additional axial thrust on the ball cage which is in the same direction as the forces which tend to cam the balls outwardly.

A major problem resulting from these forces on the balls is that the joint heats up excessively, resulting in breakage or even welding together of the parts of the joint.

It is an object of this invention to provide a constant velocity joint which can be manufactured at low cost; which is more efficient than prior art constructions; which generates less heat; which may be operated with the inner and outer members at larger angles than prior art joints; and which is dynamically balanced permitting the joint to be used at high speeds without axial thrust or vibration.

It is a further object of this invention to provide a novel ball groove development which can be manufactured with ordinary machinery at relatively low cost.

It is a further object of this invention to provide a novel method of making the inner and outer rotary members of a constant velocity joint.

In the drawings:

Fig. 5 is a partly diagrammatic showing of a step in the method of making the outer rotary member of the joint.

Fig. 6 is a partly diagrammatic showing of a step in the method of making the inner rotary member.

Fig. 7 is an elevational view of the cage.

Fig. 8 is a partly diagrammatic end showing of the step shown in Fig. 5.

Fig. 9 is a partly diagrammatic end showing of the step shown in Fig. 6.

Figure 2:
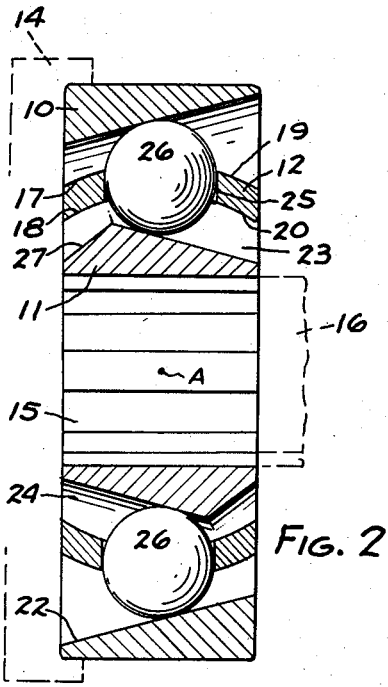
Fig. 2 is a sectional view taken along the line 2—2 in Fig. 1.
Figure 3:
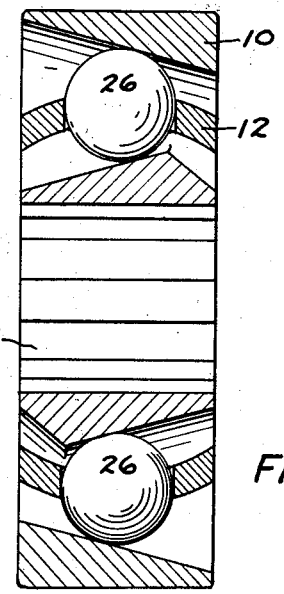
Fig. 3 is a sectional view taken along the line 3—3 in Fig. 1.
Figure 1:
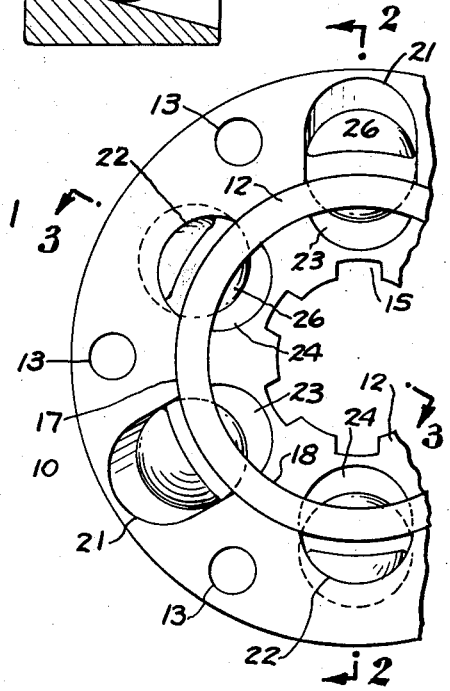
Fig. 1 is an end elevational view of a constant velocity joint embodying the invention.

Referring to Figs. 1, 2 and 3, the constant velocity joint embodying the invention comprises an outer annular member 10, an inner annular member 11 and an intermediate cage member 12. Outer member 10 is formed with axially extending openings 13 through which bolts may be passed to fasten the member 10 to a member 14. The inner periphery of the inner member 11 is formed with axially extending splines 15 for engagement with a shaft 16 formed with complementary splines. Either the shaft 16 or the member 14 may be driven to drive the other.

The outer member 10 is formed with an internal spherical surface 17 and the inner member 11 is formed with an external spherical surface 18 spaced from and concentric with the spherical surface 17, the center of the spherical surfaces being at A (Fig. 2).

Cage member 12 is of generally uniform thickness and has a spherical outer surface 19 and a spherical inner surface 20 which surfaces are generally concentric with the surfaces 17, 18.

The inner surface 17 of the outer member 10 has three sets of grooves 21, 22 formed therein. The grooves 21, 22 extend axially and are oppositely inclined at the same angle relative to the longitudinal axis of the member 10. In addition, the longitudinal axis of each groove 21, 22 lies in a plane that is common to the axis of member 10. Grooves 21, 22 are spaced alternately around the inner peripheral surface 17 of the member 10 and there is an even number of grooves so that there is a groove 22 diametrically opposite each groove 21. Diametrically opposite grooves thus have their axes parallel. Specifically, referring to Figs. 1 and 2, it will be observed that groove 21 inclines radially inwardly toward the left while groove 22 inclines radially inwardly toward the right at the same angle relative to the longitudinal axis of member 10. The longitudinal axes of the grooves are straight and the grooves themselves are preferably defined by cylindrical surfaces having a diameter corresponding closely to the diameter of the hereinafter-mentioned balls 26.

The outer surface 18 of inner member 11 has three sets of grooves formed therein references 23, 24. The grooves 23, 24 extend axially and are oppositely inclined at the same angle relative to the longitudinal axis of the member 11. In addition, the longitudinal axis of each groove 23, 24 lies in a plane that is common to the axis of member 11. Grooves 23, 24 are spaced alternately around the outer peripheral surface 18 of the member 11 and there is an even number of grooves so that there is a groove 24 diametrically opposite each groove 23. Diametrically opposite grooves thus have their axes parallel. Specifically, referring to Figs. 1 and 2, it will be observed that groove 23 inclines radially inwardly toward the right while groove 24 inclines radially inwardly toward the left at the same angle relative to the longitudinal axis of member 11. The longitudinal axes of the grooves are straight and the grooves themselves are preferably defined by cylindrical surfaces having a diameter corresponding closely to the diameter of the hereinafter-mentioned balls 26.

Grooves 21, 22 correspond in number and angular spacing with grooves 23, 24.

Cage member 12 is provided with a plurality of circumferentially spaced non-circular openings 25 equal in number to the number of grooves in the outer and inner members 10, 11. A ball 26 is provided in each opening 25 in engagement with grooves in the members. The axial extent of each opening 25 is substantially equal to the diameter of the balls 26 (Figs. 2 and 3). The circumferential extent of each opening 25 is greater than the diameter of the balls 26. In addition, at least one pair of diametrically opposite openings 25 designated 25a in Fig. 7 has a circumferential extent at least as great as the axial width of the inner and outer members in order to facilitate assembly of the universal joint, as is well known in the prior art.

In addition, to facilitate assembly, a bevel surface 27 is provided on the radially outermost edge of each groove 23, 24 in the inner member 11. Surfaces 27 provide clearance to facilitate assembly.

Figure 4:
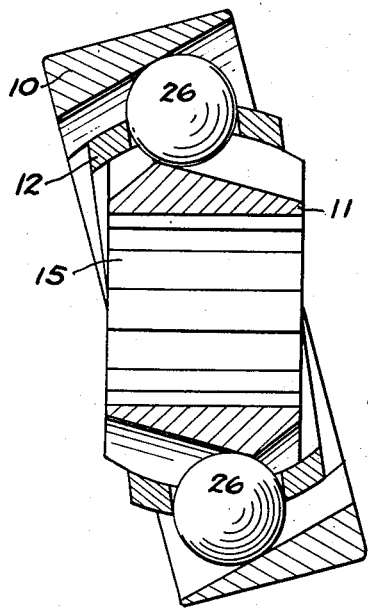
Fig. 4 is a similar sectional view showing the parts in a different operating position.

In use, one or the other of the members 10, 11 is connected to a rotating shaft so that it drives the other member through the balls 26. When the axis of one of the members 10, 11 inclines relative to the other, the balls assume a position such that a radial plane through the centers of the balls bisect the angle between the axes of the two members as shown in Fig. 4, as is well known in the prior art.

I have found, by extensive tests, that a universal joint made in accordance with my invention provides an arrangement wherein the thrust caused by the tendency of one ball to be cammed outwardly, due to the inclination of the grooves, is compensated for by the tendency of the diametrically opposed balls to move in the opposite directions. For example, referring to Figs. 1 and 2, any tendency of the balls 26 to move to the right out of the grooves 23, and, in turn, cause a thrust to the right on the cage member 12 is compensated for by the tendency of the balls 26 to move to the left out of the grooves 22, 24, thereby causing an axial thrust to the left on the cage member 12 compensating for the thrust to the right. These compensating thrusts produce a couple on the cage member which, in turn, is compensated for by a couple produced on the cage member in the opposite direction by the adjacent diametrically opposed balls shown in Figs. 1 and 3.

In addition, in a similar manner, the tendency of one ball to cause a thrust in one direction because of centrifugal action is compensated for by the tendency of the diametrically opposed ball to cause a thrust in the opposite direction. Thus, the axial thrust which may be caused by the camming out of the balls and by centrifugal action is entirely eliminated. The resultant universal joint is smooth in its operation without noise.

I have further found that a universal joint made in accordance with the invention operates at a lower temperature indicating higher efficiency and permitting its use over a greater range of angles between the axes of the inner and outer members 10 and 11. In comparison tests at identical speeds of rotation and torques between a universal joint embodying the invention and a prior art universal joint having arcuate grooves, the universal joint embodying the invention was operated at twice the angle between the axes of the rotary members before the operating temperatures were equal in both joints.

The inner and outer members for the constant velocity joint of the present invention are designed to be formed by simple and economical methods such as multiple boring or broaching. As shown in Fig. 5, the outer member 10 is formed from an annular workpiece. Diametrically opposed pairs of grooves 21, 22 are formed by an external broach 30 having a diametrically opposed set of teeth. The workpiece is held in fixed position with its axis inclined to that of the broach at the proper angle and the broach 30 is moved in a straight line in a single pass through the workpiece. The workpiece is then rotated about its axis through a predetermined angle corresponding to the angular displacement of adjacent grooves 21, 22 and its plane is rotated about a diameter to the dotted line position shown in Fig. 5 so that when the broach 30 is moved in a straight line the adjacent pair of grooves is formed on the inner periphery of the workpiece with the axes of the grooves inclined in an opposite direction from the first set of broached grooves. The successive sets of grooves are formed in this manner by rotating member 10 and inclining it alternately in opposite directions as shown.

The ball grooves in the inner member 11 are formed in a similar manner by use of broach 31. The broach 31 having diametrically opposed teeth is moved in a straight line forming an angle with the axis of the workpiece to form a diametrically opposed pair of grooves 23, 24 in a single pass. The workpiece is then rotated about its axis and about a diameter, in the same manner as in making outer member 10, to the dotted line position shown in Fig. 6 and the broach is again moved in a straight line across the periphery of member 11 to form the next adjacent pair of diametrically opposed grooves 23, 24 which are inclined in an opposite direction to the first pair of grooves. Adjacent teeth are formed in the same manner until the desired number of teeth are formed.

The spherical surfaces 17 and 18 can be formed on the members 10, 11 before or after the formation of the grooves.

The grooves in the members may be formed without rotating the members about their diametral axes as follows. The broach 31 is moved in a straight line forming an angle with the axis of the workpiece to form a diametrically opposed pair of grooves 23, 24. The workpiece is then rotated relative to the tool through an angle which is twice the angle between adjacent grooves and the tool is moved in the same straight line to form another pair of grooves. The workpiece is again rotated through an angle which is twice the angle between adjacent grooves and the tool moved relative to the grooves to form a further pair of grooves. In the case where there are three pairs of grooves in each member, this would complete the formation of the grooves, adjacent grooves being inclined in opposite directions relative to the axis of the member.

By broaching the teeth, I am able to form the teeth in finished configuration and with the desired finish quickly and with a minimum expenditure of time and labor.

The grooves may also be formed by a double boring head instead of by a broaching method. The relative positions of the boring head and the members and the steps involved would be the same as described above in connection with the use of the boring tool.

Figure 11:
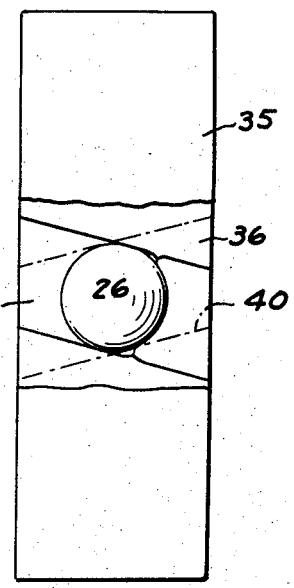
Fig. 11 is a side elevational view similar to Fig. 10 of a modified form of the invention, parts being broken away.
Figure 12:
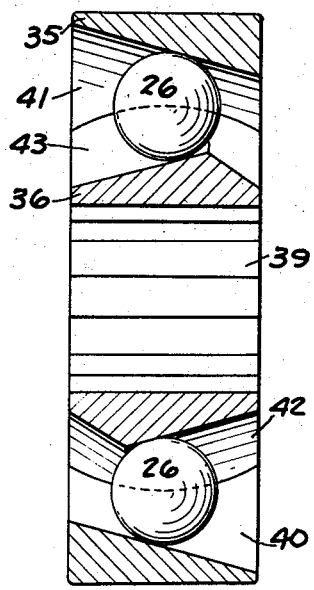
Fig. 12 is a sectional view taken along the line 12—12 in Fig. 13.
Figure 13:
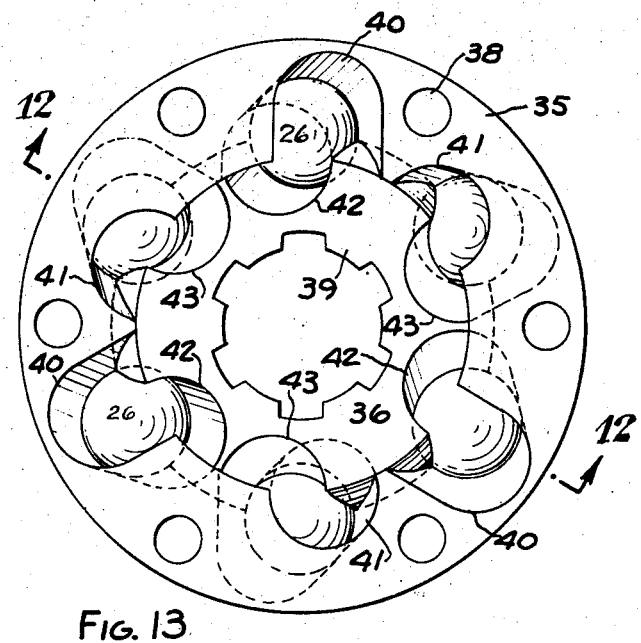
Fig. 13 is an end elevational view of the modified form of the invention shown in Fig. 11.

A modified form of the invention is shown in Figs. 11–13. In this form of the invention the universal joint comprises an outer annular member 35 and an inner annular member 36, the outer member 35 being formed with an internal spherical surface having substantially the same diameter as the external spherical surface formed on the inner member 36. The inner surface of the outer member 35 is formed with three pairs of grooves 40, 41 and the inner member 36 is formed with three corresponding pairs of grooves 42, 43. The grooves 40, 41 of each pair of grooves in outer member 35 are diametrically opposed as are the grooves 42, 43 of each pair of grooves in the inner member 36. Grooves 40, 42 and 41, 43 are in register and balls 26 are provided in the registered grooves.

As viewed in Fig. 13, grooves 40 extend in a generally radially inward counterclockwise direction so that the grooves are inclined to the axis of the member 35, but the axes of the grooves do not intersect the axis of the member 35. Circumferentially adjacent grooves 41 in the outer member 35 are inclined in an opposite direction, that is, they extend in a generally radially outward clockwise direction when viewed in Fig. 13.

The grooves in the inner member 36 are oppositely inclined to the adjacent grooves in the outer member 35. Specifically, grooves 42, which are radially adjacent grooves 40, extend in a generally radially outward clockwise direction and grooves 43, which are radially adjacent grooves 41 extend in a generally radially inward counterclockwise direction.

The axes of the grooves 40, 41 in each pair on member 35 are parallel as are the axes of grooves 42, 43 in each pair on member 36. Each pair of grooves therefore can be formed in the same manner as in the previous form of the invention, namely, by a single pass of a broaching tool.

The outer member 35 is formed with holes 38 whereby it may be bolted to a rotating member and the inner member 36 is provided with splines 39 whereby it may be connected to a rotating member.

As viewed in Fig. 11, in this form of the invention the axes of adjacent grooves intersect within the confines of the ends of the joint when the joint is viewed from the side.

It should be noted that in this form of the invention the cage has been eliminated.

Figure 10:
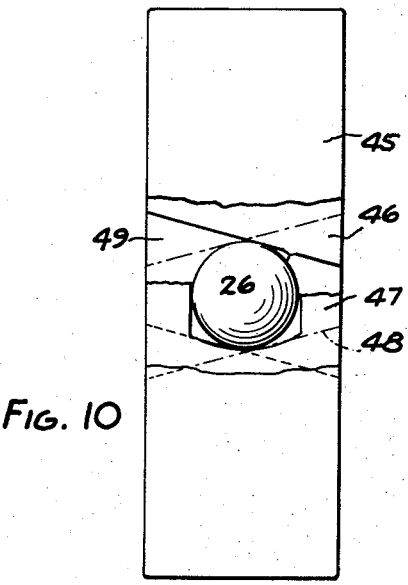
Fig. 10 is a side elevational view of a modified form of the invention, parts being broken away.

In the form of the invention shown in Fig. 10 the joint comprises an outer annular member 45, an inner annular member 46 and a cage 47 positioned between the annular members and contacting the spherical surfaces thereon. The joint shown in Fig. 10 otherwise is similar to that shown in Figs. 11–13 and includes pairs of grooves which are inclined to the axis of their respective member but do not intersect the axis. Circumferentially adjacent grooves are oppositely inclined so that their axes intersect as, for example, the axes of adjacent grooves 48, 49 when viewed as in Fig. 10.

I claim:

1. A constant velocity universal joint of the type wherein a pair of inner and outer rotary members provided with axially extending opposed grooves are coupled for rotation by means of a plurality of balls engaging said grooves and retained in assembled condition by means of a cage, characterized in that the inner and outer members are each provided with an equal and even number of grooves that are spaced equally around the members, the adjacent grooves in each member having straight axes alternately inclined at the same angle to the longitudinal axis of the member so that the axes of each set of diametrically opposed grooves are parallel, the inner and outer members being assembled so that the axes of juxtaposed grooves are inclined oppositely to the same extent when the longitudinal axes of the two members coincide.

2. The combination set forth in claim 1 wherein the axis of each groove intersects the longitudinal axis of the member in which the groove is formed.

3. In a constant velocity universal joint, the combination comprising an inner rotary member having a spherical external surface, an outer member having a spherical internal surface, said external surface on said inner member and said internal surface on said outer member being concentric and spaced from one another, an intermediate cage member positioned between said inner and outer members and having internal and external surfaces concentric with said spherical surfaces on said members, said inner member having an even number of axially extending grooves in its outer periphery, the longitudinal axes of said grooves being straight and lying in common planes with the axis of said member, said grooves being inclined at equal angles to the axis of said member, said outer member having an even number of axially extending grooves in its inner periphery, the longitudinal axes of said last mentioned grooves being straight and lying in common planes with the axis of said outer member, said last mentioned grooves being inclined at equal angles to the axis of said outer member, said cage member being formed with circumferentially spaced openings, balls in said openings in register with said grooves, adjacent grooves in each said member being inclined in opposite directions with respect to the axis of said member, and diametrically opposed grooves in each said member being parallel to one another.

4. In a constant velocity universal joint, the combination comprising an inner rotary member having a spherical external surface, an outer member having a spherical internal surface, means for operatively connecting one of said members to a drive member, means for operatively connecting the other of said members to a driven member, said external surface on said inner member and said internal surface on said outer member being concentric and spaced from one another, an intermediate cage member positioned between said inner and outer members and having internal and external surfaces concentric with said spherical surfaces on said members, said inner member having an even number of axially extending grooves in its outer periphery, the longitudinal axes of said grooves being straight and lying in common planes with the axis of said inner member, said grooves being inclined at equal angles to the axis of said inner member, said outer member having an even number of axially extending grooves in its inner periphery, the longitudinal axes of said last mentioned grooves being straight and lying in common planes with the axis of said outer member, said last mentioned grooves being inclined at equal angles to the axis of said outer member, said cage member being formed with circumferentially spaced openings, balls in said openings in register with said grooves, adjacent grooves in each said member being inclined in opposite directions with respect to the axis of said member, and diametrically opposed grooves in each said member being parallel to one another.

5. In a constant velocity universal joint, the combination comprising an outer annular rotary member, an inner annular rotary member positioned within said outer rotary member, the external surface on said inner member and the internal surface on said outer member being concentric and spaced from one another, an intermediate cage member positioned between said inner an outer members and having internal and external surfaces concentric with said spherical surfaces on said members, said inner member having an even number of axially extending grooves in its outer periphery, the longitudinal axes of said grooves being straight and lying in common planes with the axis of said member, said grooves being inclined at equal angles to the axis of said member, said outer member having an even number of axially extending grooves in its inner periphery, the longitudinal axes of said last mentioned grooves being straight and lying in common planes with the axis of said outer member, said last mentioned grooves being inclined at equal angles to the axis of said outer member, said cage member being formed with circumferentially spaced openings, balls in said openings in register with said grooves, adjacent grooves in each said member being inclined in opposite directions with respect to the axis of said member, and diametrically opposed grooves in each said member being parallel to one another.

6. In a constant velocity universal joint, the combination comprising an inner rotary member having a spherical external surface, an outer member having a spherical internal surface, said external surface on said inner member and said internal surface on said outer member being concentric and spaced from one another, an intermediate cage member positioned between said inner and outer members and having internal and external surfaces concentric with said spherical surfaces on said members, the axial widths of said inner, intermediate and outer members being substantially equal, said inner member having an even number of axially extending grooves in its outer periphery, the longitudinal axes of said grooves being straight and lying in common planes with the axis of said member, said grooves being inclined at equal angles to the axis of said member, said outer member having an even number of axially extending grooves in its inner periphery, the longitudinal axes of said last mentioned grooves being straight and lying in common planes with the axis of said outer member, said last mentioned grooves being inclined at equal angles to the axis of said outer member, said cage member being formed with circumferentially spaced openings, balls in said openings in register with said grooves, adjacent grooves in each said member being inclined in opposite directions with respect to the axis of said member, diametrically opposed grooves in each said member being parallel to one another, the axes of diametrically opposed pairs of grooves of each member which are inclined in one direction intersecting the axis of said member at a point spaced axially from the center of its spherical surface, the other diametrically opposed pairs of grooves of each member which are inclined in the opposite direction having their axes intersecting the axis of said member at a point on the opposite side of the center of the spherical surface of said member.

7. A constant velocity universal joint of the type wherein a pair of inner and outer rotary members provided with axially extending opposed grooves are coupled for rotation by means of a plurality of balls engaging said grooves and retained in assembled condition by means of a cage, characterized in that the inner and outer members are each provided with at least two pairs of diametrically opposed straight grooves, one pair of said grooves being inclined in one direction to the longitudinal axis of the member and the other pair of said grooves being inclined in an opposite direction to the longitudinal axis of the member at the same angle, the inner and outer members being assembled so that the axes of juxtaposed grooves are inclined oppositely to the same extent when the longitudinal axes of the two members coincide.

8. The combination set forth in claim 7 wherein the axis of each groove intersects the longitudinal axis of the member in which the groove is formed.

9. A constant velocity universal joint of the type wherein a pair of inner and outer rotary members provided with axially extending opposed grooves are coupled for rotation by means of a plurality of balls engaging said grooves, characterized in that the inner and outer members are each provided with an equal and even number of grooves that are spaced equally around the members, the adjacent grooves in each member having straight axes alternately inclined at the same angle to the longitudinal axis of the member so that the axes of each set of diametrically opposed grooves are parallel, the inner and outer members being assembled so that the axes of juxtaposed grooves are inclined oppositely to the same extent when the longitudinal axes of the two members coincide.

10. In a constant velocity universal joint, the combination comprising an inner rotary member having a spherical external surface, an outer member having a spherical internal surface, said external surface on said inner member and said internal surface on said outer member being concentric and spaced from one another, said inner member having an even number of axially extending grooves in its outer periphery, the longitudinal axes of said grooves being straight and lying in common planes with the axis of said member, said grooves being inclined at equal angles to the axis of said member, said outer member having an even number of axially extending grooves in its inner periphery, the longitudinal axes of said last mentioned grooves being straight and lying in common planes with the axis of said outer member, said last mentioned grooves being inclined at equal angles to the axis of said outer member, balls in register with said grooves, adjacent grooves in each said member being inclined in opposite directions with respect to the axis of said member, and diametrically opposed grooves in each said member being parallel to one another.

11. In a constant velocity universal joint, the combination comprising an inner rotary member having a spherical external surface, an outer member having a spherical internal surface, said external surface on said inner member and said internal surface on said outer member being concentric and spaced from one another, an intermediate cage member positioned between said inner and outer members and having internal and external surfaces concentric with said spherical surfaces on said members, said inner member having an even number of axially extending grooves in its outer periphery, the longitudinal axes of said grooves being straight, said grooves being inclined at equal angles to the axis of said member, said outer member having an even number of axially extending grooves in its inner periphery, the longitudinal axes of said grooves being straight, said grooves being inclined at equal angles to the axis of said member, said cage member being formed with circumferentially spaced openings, balls in said openings in register with said grooves, adjacent grooves in each said member being inclined in opposite directions with respect to the axis of said member, and diametrically opposed grooves in each said member being parallel to one another.

12. A constant velocity universal joint of the type wherein a pair of inner and outer rotary members provided with axially extending opposed grooves are coupled for rotation by means of a plurality of balls engaging said grooves and retained in assembled condition by means of a cage, characterized in that the inner and outer members are each provided with at least two pairs of diametrically opposed straight grooves, adjacent grooves in each said member being inclined in an opposite direction to the longitudinal axis of said member, the axes of juxtaposed grooves being inclined oppositely to the same extent when the longitudinal axes of the two members coincide.

References Cited in the file of this patent

UNITED STATES PATENTS

| | | |
|---|---|---|
| 1,854,897 | Ganster | Apr. 19, 1932 |
| 2,321,448 | Anderson | June 8, 1943 |
| 2,322,570 | Dodge | June 22, 1943 |
| 2,823,449 | Potter | Feb. 18, 1958 |